United States Patent

Schubert et al.

Patent Number: 6,082,891
Date of Patent: Jul. 4, 2000

[54] STATIC MICROMIXER

[75] Inventors: Klaus Schubert, Karlsruhe; Wilhelm Bier, Eggenstein-Leopoldshafen; Erhard Herrmann, Leverkusen; Thomas Menzel, Hilten; Gerd Linder, Karlsruhe, all of Germany

[73] Assignees: Forschungszentrum Karlsruhe GmbH, Karlsruhe; Bayer AG, Leverkusen, both of Germany

[21] Appl. No.: 09/062,074

[22] Filed: Apr. 17, 1998

Related U.S. Application Data

[63] Continuation-in-part of application No. PCT/EP96/03162, Jul. 18, 1996.

[30] Foreign Application Priority Data

Oct. 28, 1995 [DE] Germany .......................... 195 40 292

[51] Int. Cl.$^7$ ................................................. B01F 5/06
[52] U.S. Cl. .......................................... 366/338; 366/340
[58] Field of Search .................... 366/181.5, 336, 366/337, 340, 338; 138/37, 38, 39, 42; 48/189.4

[56] References Cited

U.S. PATENT DOCUMENTS

| | | | |
|---|---|---|---|
| 4,222,671 | 9/1980 | Gilmore | 366/337 |
| 5,094,788 | 3/1992 | Schrenk et al. | 366/340 |
| 5,137,369 | 8/1992 | Hodan | 366/340 |
| 5,531,831 | 7/1996 | Sweeney et al. | 366/340 |
| 5,803,600 | 9/1998 | Schubert et al. | 138/38 |

FOREIGN PATENT DOCUMENTS

| | | |
|---|---|---|
| 57-071627 | 5/1982 | Japan . |
| 2 073 604 | 10/1981 | United Kingdom . |
| WO 91/16970 | 11/1991 | WIPO . |
| WO 94/21372 | 9/1994 | WIPO . |
| WO 95/30476 | 11/1995 | WIPO . |

*Primary Examiner*—Charles E. Cooley
*Attorney, Agent, or Firm*—Klaus J. Bach

[57] ABSTRACT

In a static micromixer a flow guide structure consisting of a stack of foils provided with passages formed into alternate foils so as to extend between a mixing chamber at one end of the flow guide structure and different admission chambers at the opposite end of the flow guide structure, the passages are curved so that they are all parallel at their exit ends adjacent the mixing chamber and, at their entrance ends, the flow guide structure has face areas which are inclined with respect to the exit end face of the flow guide structure at such an angle that the curved passages have all about the same length.

4 Claims, 2 Drawing Sheets

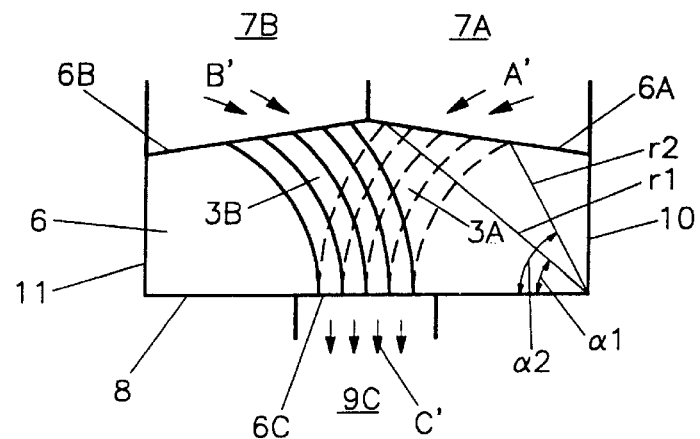
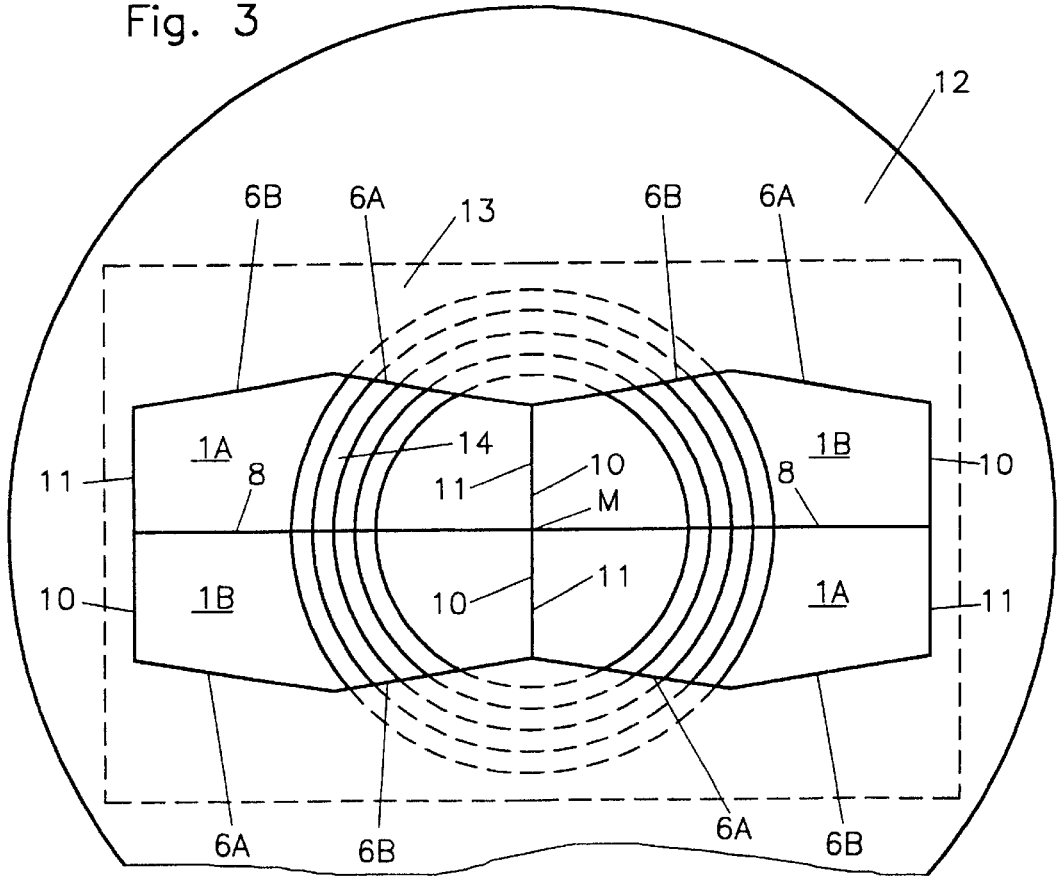

STATIC MICROMIXER

This is a Continuation-in-Part application of international patent application PCT/EP96/03162 filed Jul. 18, 1996 and claiming priority of German application 195 40 292.8 filed Oct. 28, 1995.

BACKGROUND OF THE INVENTION

The invention relates to a static micromixer with a mixing chamber and a guide structure arranged upstream of the mixing chamber for the separate admission of the fluids to be mixed in the mixing chamber.

WO 91/16970 A1 discloses a mixing arrangement in a column with mixing-, catalyst- and guide elements arranged in various layers. Adjacent elements within one layer are arranged inclined with respect to the main flow direction. For this purpose, the elements may have the shape of an oblique prism through which parallel passages of square cross-section extend and which may be made by the combination of structured plates. With such an arrangement, a uniform flow resistance of the fluids to be mixed is obtained; however, the mixing efficiency decreases from the center to the peripheral zones of the column space at the downstream end of the elements adjacent the mixing chamber.

DE 31 14 195 C2 discloses such a mixing apparatus for the mixing of flowing media with at least two inlet channels, with a passage structure arranged adjacent the inlet channels and with an outlet channel connected to the common outlet end of the passage structure. The passage structure through which the individual passages extend and which serves to admit the fluids to be mixed separately consists of individual plate units disposed on top of one another and consisting each of a separation wall and a corrugated sheet. The individual passages of each unit are formed by the corrugations of the corrugated sheet and the adjacent separating wall. The units are so disposed on top of one another that the individual passages of adjacent units are inclined with respect to each other at predetermined angles. In one embodiment, the arrangement is such that the passage structure includes parallel individual passages of equal length wherein the individual passages of the respective units are in communication alternately with two supply channels, but have outlets disposed on top of one another at the outlet end of the passage structure. Since the respective fluid can enter only every second individual passage—taken in the height extension of the passage structure—the inlet to the intermediate unit must be closed (see column 6, lines 26 to 33 in connection with FIGS. 7a 7b), whereby unused clearance volumes are generated. But also with this arrangement, optimal mixing occurs only in the middle of the outlet end of the passage structure; the mixing effectiveness decreases toward the outside end areas. Also, in this case, providing the required inlet blocking structures is relatively complicated and generates manufacturing problems particularly with small passage cross-sections.

It is therefore the object of the present invention to provide a static micromixer with a flow guide structure for the separate admission of the fluids to be mixed in a mixing chamber in which the local and time effectiveness of the mixing step in the mixing chamber is increased. In addition, the passages in the guide structure should be vacuum and pressure tight so that it can be used particularly in chemical engineering applications.

SUMMARY OF THE INVENTION

In a static micromixer a flow guide structure consisting of a stack of foils provided with passages formed into alternate foils so as to extend between a mixing chamber at one end of the flow guide structure and different admission chambers at the opposite end of the flow guide structure, the passages are curved so that they are all parallel at their exit ends adjacent the mixing chamber and, at their entrance ends, the flow guide structure has face areas which are inclined with respect to the exit end face of the flow guide structure at such an angle that the curved passages have all about the same length.

With the curved parallel passages of the flow guide structure A and B, which lead the fluid into the mixing chamber in the general flow direction, a uniform mixing is obtained over the whole outlet area while there are no unused clearance volumes in the guide structure. Because of the microstructuring of the rows of passages, the fluids to be mixed or to be dispersed are divided into a multitude of fine neighboring flow filaments or lamellas which, upon entering the mixing chamber, mix rapidly and in a short distance or are divided into a dispersing phase which forms droplets or bubbles and an enveloping phase forming a continuous phase. The packing density of the passage openings and consequently of the flow filaments at the entrance into the mixing chamber is several thousand openings or flow filaments per $cm^2$.

An embodiment of the micromixer according to the invention and a method of making such a micromixer will be described on the basis of the accompanying drawings.

BRIEF DESCRIPTION OF THE DRAWINGS

FIG. 2 is a schematic top view of a micromixer, and FIG. 3 explains the method of manufacturing the grooved foils.

DESCRIPTION OF PREFERRED EMBODIMENTS

Figure 1:
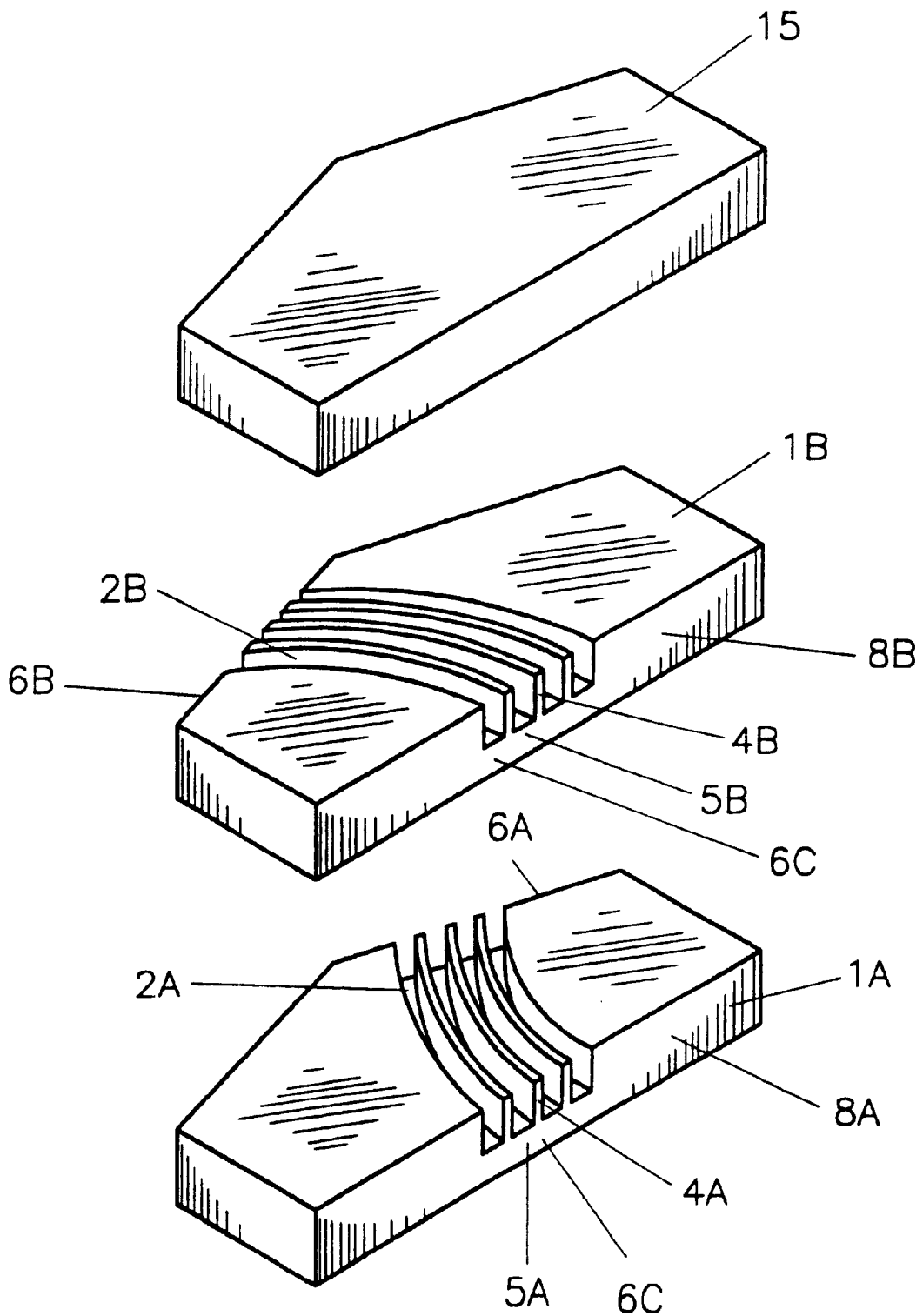
FIG. 1 shows, greatly enlarged, two grooved foils and a cover plate disposed on top of one another.

As shown in FIG. 1, the micromixer comprises plate-like elements which are disposed on top of one another and actually consist of thin foils 1A and 1B having a thickness of 30 to 1000 $\mu$m, preferably <250 $\mu$m and a lateral extension in the mm range. A number of curved arc-like grooves 2A, 2B is formed into the foils 1A, 1B so as to be arranged closely adjacent one another. The foils are disposed on top of one another such that, alternately, rows of passages 3A and 4B are formed (see FIG. 2).

The grooves have depths of <1000 $\mu$m preferably <250 $\mu$m, widths of 10 $\mu$m up to a mm size, preferably however <500 $\mu$m, a wall thickness of the webs 4A, 4B between the grooves and also of the bottoms 5A, 5B of <1000 $\mu$m, preferably <250 $\mu$m. The set of grooves 2B extends from the left rear face 6B in the shape of an arc to the center area 6C of the front face 8B of the foil 1B; the set of grooves 2A extends in the shape of an arc from the right rear face 6A to the center area 6C of the front face 8A of the foil 1A. Both types of foils have the same outline. The outline has the geometric shape of a pentagon formed by a rectangle with an equilateral triangle connected thereto, wherein one side of the rectangle forms the base of the equilateral triangle.

A plurality of the foils 1A and 1B are placed, in an alternate array and coinciding fashion, on top of one another so that a guide structure 6 is provided as it is shown schematically in FIG. 2, in a top view. At both face areas 6A, 6B formed by the legs of the triangle, fluid admission chambers 7A, 7B for the fluid A' and B' are arranged. The mixing chamber 9C is disposed adjacent the center area of the opposite face 8, the end portions of the passages 3A, 4B leading to the mixing chamber 9C being in a parallel alignment so that the fluids A', B', to be mixed or to be dispersed enter the mixing chamber 9C in a common flow direction.

The leg face areas 6A, 6B are inclined with respect to the face area 8 or, respectively, the side surfaces 10, 11 of the guide structure 6 such that the series of arc-like curved passages 3A and 4B leading alternately from the admission chambers 7A and 7B to the mixing chamber 9C have approximately all the same length.

For the circular grooves or passages consequently the arc length should be constant:

$$L = \frac{2\pi r \cdot \alpha}{360} = \text{constant}$$

wherein r is the respective radius of curvature and $\alpha$ is the respective arc angle of the particular grooves or passages. Such a requirement would lead to curved face areas 6A and 6B. However, approximated flat face areas are substituted using, for example, the approximation rule:

$$\frac{\alpha_2}{\alpha_1} = \frac{r_1}{r_2}$$

wherein $r_1$ represents the largest and $r_2$ represents the smallest radius and $\alpha_1$ and $\alpha_2$ represent the corresponding arc angles of the outermost and the innermost grooves.

After the foils 1A, 1B are stacked on top of one another, they are provided with cover plates 15 and interconnected in a vacuum and pressure-tight manner, for example, by diffusion welding so that the guide structure 6 formed thereby becomes a homogeneous microstructure body which is then connected to the chambers 7A, 7B and 9C.

For the manufacture of the foils 1A, 1B, a rotatable sinter metal plate 12 with a ground surface can be used, on which a raw foil 13 of a metal such as copper or silver is disposed and held in place by vacuum (see FIG. 3). By a shaped diamond (not shown), a number of concentric circular grooves 14 are cut into the center area of the foil between a center point of rotation M and the periphery of the foil 13. Then the raw foil 13 is divided into four individual foils 1A, 1B each having a longitudinal side 8 through which the series of grooves 14 extend centrally and at a right angle and two small side faces 10, 11 and two leg sides 6A, 6B through which the grooves 14 also extend. The four segments—taken apart—form the earlier mentioned congruent pentagons.

The foils do not need to be cut individually, but a number of foils can be placed on top of one another and can be cut into the pentagons in a single cutting step. The grooves are preferably rectangular in cross-section.

What is claimed is:

1. A static micromixer comprising a flow guide structure having a separate flow entrance areas for receiving fluids from different fluid supplies and a common outlet area for supplying said fluids to a mixing chamber, said flow guide structure consisting of a plurality of plate-like elements disposed on top of one another to form a stack, each having a series of adjacent grooves extending therethrough, said plate-like elements including two different types of plates arranged in said stack in alternate positions, one having grooves with entrance openings in one area of said plates and the other having grooves with entrance openings in another area of said plate so that the entrance openings of the different types of plates can be arranged in communication with different fluid admission chambers, and each of said plates having exit openings in the same areas of said plates so that the exit openings are all in communication with said mixing chamber, said flow guide structure having the following features:

a) said plate-like elements consist of foils having a thickness of 30 to 1000 $\mu$m and a lateral width in a mm range.

b) said grooves have a depth of <1000 $\mu$m, a width of 10 $\mu$m to the mm, and the webs formed between the grooves and bottom walls of the grooves have a thickness of <1000 $\mu$m, c) the series of adjacent grooves formed in the stack of foils are curved in an arc-like fashion and extend alternately between said mixing chamber and said two admission chambers in such a way that their ends adjacent the mixing chamber extend all parallel and normal to a surface of the flow guide structure including the exit openings.

2. A static micromixer according to claim 1, wherein said plate-like elements have a thickness of <250 $\mu$m, said grooves have a depth of <250 $\mu$m and a width of <500 $\mu$m and said webs between said grooves and said groove bottom walls have a thickness of <250 $\mu$m.

3. A static micromixer according to claim 1, wherein said foils disposed in said stack have, in a top view, the geometrical shape of a pentagon comprised of a rectangular area and, adjacent one side thereof, an equilateral triangle having a base formed by said one side of said rectangular area and two legs defining angled surface areas opposite a longitudinal end face of said guide structure formed by a longitudinal side of said rectangle where said mixing chamber is disposed, said legs of said triangle being inclined with respect to said base at such an angle that the arced grooves extending between said longitudinal end face and said angled surface areas have all about the same length.

4. A static micromixer according to claim 1, wherein said foils disposed on top of one another are all joined so as to form a vacuum and pressure-tight microstructure flow guide body connected to said admission chambers and said mixing chamber.

\* \* \* \* \*